UNITED STATES PATENT OFFICE.

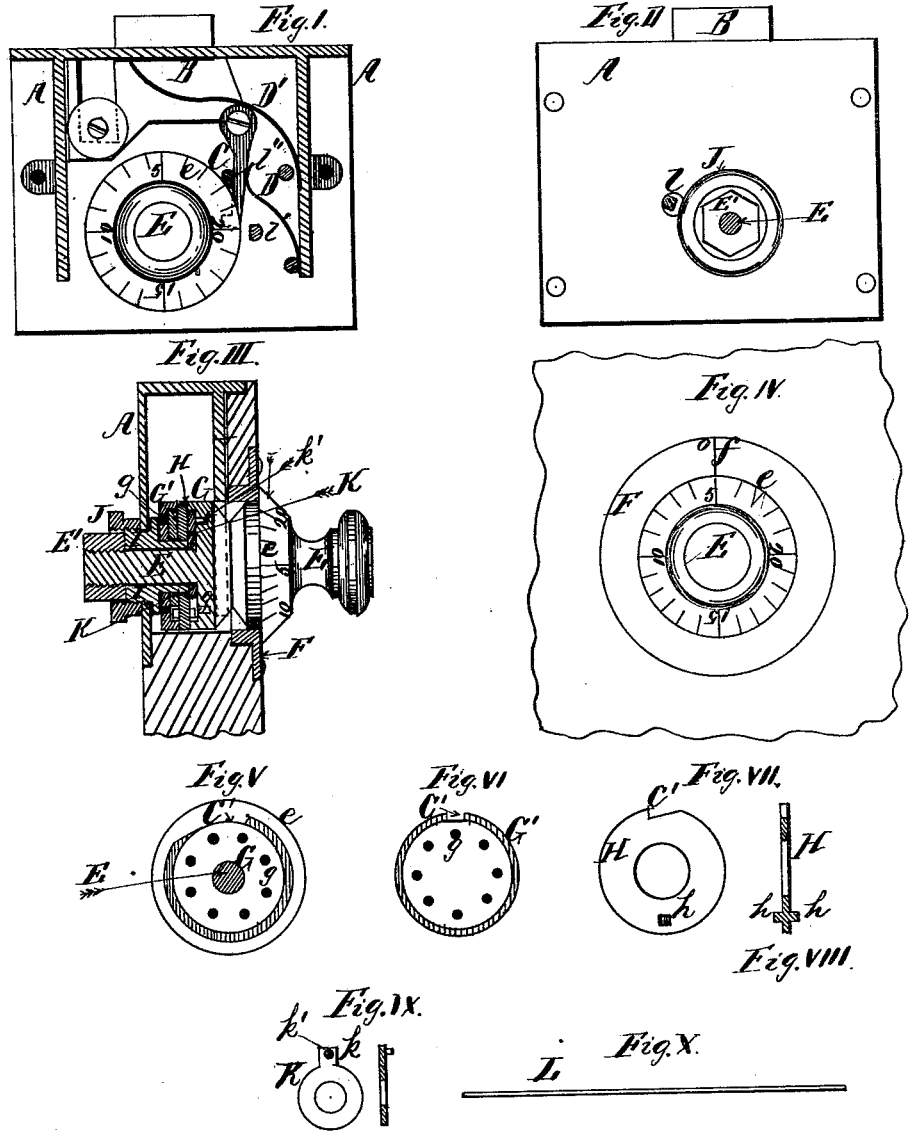

WILLIAM G. VAN BUSKIRK, OF FISHKILL LANDING, AND GORDON HAY, OF NEW YORK, N. Y.

IMPROVEMENT IN PERMUTATION-LOCKS.

Specification forming part of Letters Patent No. 202,970, dated April 30, 1878; application filed November 6, 1877.

*To all whom it may concern:*

Be it known that we, WILLIAM G. VAN BUSKIRK, of Fishkill Landing, county of Dutchess, State of New York, and GORDON HAY, of the city of New York, county of New York, and State of New York, have invented a new and useful Improvement in Combination-Locks, of which the following is the specification:

This improvement relates to the mechanism connected with, and the manner of changing the combination in, locks especially adapted for use on house or desk doors, drawers, trunks, &c., in combination with certain arrangements of the dog and stumps upon the lock-case, as will be fully understood by reference to the accompanying drawings, of which—

Figure 1 is a sectional plan of the lock with the face-plate removed. Fig. 2 is a rear view of the lock. Fig. 3 is a sectional elevation of the same, taken through the spindle. Fig. 4 is an outside elevation of the lock, with a portion of the door to which it may be attached. Fig. 5 is a sectional elevation of the spindle, showing the inside of the combination-wheel attached thereto. Fig. 6 is an elevation of another of the combination-wheels, of which there may be several. Fig. 7 is an elevation of the combination dog disk. Fig. 8 is a section of the piece shown in Fig. 7. Fig. 9 is an elevation of one of the combination-plates, which has a small lug on one of its sides that fits into the combination-holes in the side of the combination-wheel. Fig. 10 is a plan of the stop-wire.

There being nothing new in the case A of the lock, nor in the bolt B, the dog C, or the spring D, those parts will not be particularly described.

The spindle E has an exterior disk, e, which is graduated and figured, and fits against a face-plate, F, attached to the door or to whatever else the lock is to be attached, the said face-plate being marked with a zero-mark, f, to which the required numbers of the disk e are to be turned in the usual manner of combination-locks. The spindle E also carries two or more combination-wheels, G and G', the first of which is fixed to and is a part of the spindle, while the other wheel (or wheels) is put loosely upon the said spindle, and is turned by the interposed dog-disk H, of which there will be as many as there are additional wheels G'. A nut, E', upon the end of the spindle screws the loose wheels, disks, &c., securely behind the bushing-piece I, and the latter piece is screwed fast in the inside plate of the lock by means of the nut J.

In the faces of the wheels G and G' there are holes or mortises g of, say, one-sixteenth of an inch (more or less) in diameter and depth. Against each of these mortised faces of the said wheels will be a combination-plate, K, which has a lug, k, projecting radially from one of its sides, and a dog or tooth, k', projecting laterally from one of its sides, will fit into the mortises g, as may be required.

The dog-disk H has a dog, h, projecting from each of its sides, and when the parts are assembled together in their proper working order, as shown in Fig. 5, the dogs h will catch against the edge of one or the other of the lugs k of the plate K, as the case may be, and thus the loose wheels G' will be turned.

In each of the peripheries of the wheels G and G', and also in the periphery or peripheries of the disk H, there will be notches C', all of which must engage the dog C of the lock-bolt before the said bolt can be drawn, as is customary in combination-locks.

By changing the combination-plates K so that their dog-teeth k' will enter into any desired one of their respective mortises g, the combination will be changed; and to ascertain what the combination is, as it will read upon the graduated disk on the outside, we take a wire stop, L, sharpened at one end, so that it may be easily inserted, and pass it through the small hole l in the inside plate of the lock, just below the free end of the dog C, in which position it will hold the dog up off the combination-wheels, and will enter the notch C' in the outside combination-wheel when the spindle is turned around so as to permit it thus to enter, and then the figure on the graduated disk which is at the zero-mark f will be noted, and this will be the first figure of the combination; and then the spindle will be turned around until the next notch C' drops onto the wire stop L, and then the figure on the graduated disk will be noted as the second figure of the combination, and, so on, the successive figures of the combination will be picked up and ascertained by means of the wire stop L and the graduated plate.

The dog C is pivoted to the bolt B, and guided between two stumps, *i i'*, against the former of which it impinges and holds the bolt from being retracted until the tumblers are set upon the proper combination, when the spring D throws the dog downward into the tumbler-notches. The rotation of the spindle then withdraws the bolt in the usual manner. The bolt is thrown outward by the spring D'. The stump *i* takes off from the tumblers any pressure upon the bolts in feeling for the combination.

We are aware that it is not broadly new to change the combination by means of perforated and pin disks; nor is it broadly new to relieve the tumblers of the bolt-pressure when improperly forced inward.

What we claim as new, and desire to secure by Letters Patent, is—

The combination of the alternate perforated and pin disks with their beveled notches C', the pivoted dog C, and stumps *i i'*, bolt B, and spring D' to throw it outward, all arranged and combined as and for the purposes set forth.

This specification signed this 26th day of September, 1877.

WM. G. VAN BUSKIRK.
GORDON HAY.

Witnesses:
RICHARD PEMER,
CHR. RIEGELMAN.